(12) United States Patent
Marziali

(10) Patent No.: US 6,273,848 B1
(45) Date of Patent: Aug. 14, 2001

(54) METHOD FOR SIMULTANEOUS CENTRIFUGATION OF SAMPLES

(75) Inventor: Andrea Marziali, North Vancouver (CA)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 0 days.

(21) Appl. No.: 09/176,701

(22) Filed: Oct. 21, 1998

Related U.S. Application Data

(63) Continuation of application No. 08/928,531, filed on Sep. 12, 1997, now abandoned.

(51) Int. Cl.[7] ............................. B04B 5/10; B04B 9/06; B04B 11/00
(52) U.S. Cl. .................................................. 494/37
(58) Field of Search ............................ 494/16, 17, 19, 494/23, 24, 25, 26, 31, 33, 34, 37, 43, 84, 85; 366/217; 422/72

(56) References Cited

U.S. PATENT DOCUMENTS

| | | |
|---|---|---|
| 442,461 | 12/1890 | Sharples et al. . |
| 478,737 | 7/1892 | Cushman . |
| 537,106 | 4/1895 | Curtis . |

(List continued on next page.)

FOREIGN PATENT DOCUMENTS

| | | | |
|---|---|---|---|
| 22055/35 | * 4/1936 | (AU) . | |
| 322189 | * 6/1920 | (DE) | ......................... 494/33 |
| 1242241 | * 7/1986 | (SU) | ......................... 494/33 |
| 1622017 | * 1/1991 | (SU) | ......................... 494/33 |

*Primary Examiner*—Charles E. Cooley
(74) *Attorney, Agent, or Firm*—Bozicevic, Field & Francis, LLP; Carol L. Francis

(57) ABSTRACT

A flow-through microcentrifuge comprising a container in which a sample is placed, and a power source capable of rotating the container around an axis. High speed rotation causes the components of the sample to separate according to their respective densities. Pressurized gas, a flowing liquid, electromagnetism, or an engine can power rotation of the container. Due to the small size of the flow-through microcentrifuge, speeds can reach up to 600,000 rpm, with a corresponding increase in centrifugal acceleration up to 1,500,000 g. In addition to separation, the flow-through microcentrifuge can resuspend pelleted material in a liquid by rotating in one direction and then in the opposite direction, repeatedly. The flow-through microcentrifuge is also able to mix two or more reagents using this method. The flow-through microcentrifuge is modular in nature, meaning two or more can be placed together in any configuration and run by the same power source. In the preferred embodiment, several microcentrifuges are used simultaneously to centrifuge samples in multi-well plates.

25 Claims, 14 Drawing Sheets

U.S. PATENT DOCUMENTS

| | | |
|---|---|---|
| 556,567 | 3/1896 | Waring . |
| 648,601 * | 5/1900 | Stridsberg .............................. 494/33 |
| 689,572 * | 12/1901 | Berrigan ................................. 494/33 |
| 731,215 | 6/1903 | Patterson . |
| 742,815 | 10/1903 | Valerius . |
| 749,104 * | 1/1904 | Schoenefeldt ......................... 494/33 |
| 773,220 | 10/1904 | Patterson . |
| 790,081 * | 5/1905 | Seger ..................................... 494/33 |
| 895,173 * | 8/1908 | Ecaubert ................................ 494/33 |
| 901,056 | 10/1908 | Atkins et al. . |
| 981,758 | 1/1911 | Goehler . |
| 1,011,929 * | 12/1911 | Ecaubert ................................ 494/33 |
| 1,111,600 * | 9/1914 | Mauss .................................... 494/33 |
| 1,163,875 | 12/1915 | Wetherbee . |
| 1,530,758 * | 3/1925 | Coleman . |
| 1,566,770 * | 12/1925 | Packer ................................... 494/33 |
| 1,630,412 | 5/1927 | Wescott . |
| 1,684,870 | 9/1928 | Lewis . |
| 1,768,761 | 7/1930 | Haultain . |
| 1,853,249 * | 4/1932 | Ainlay . |
| 1,882,390 | 10/1932 | MacIsaac . |
| 2,340,825 | 2/1944 | Stern . |
| 2,516,655 | 7/1950 | Smith . |
| 2,822,127 * | 2/1958 | Sinn ...................................... 494/33 |
| 2,875,949 | 3/1959 | Tarsoly . |
| 3,430,849 | 3/1969 | Gibson et al. . |
| 3,722,790 | 3/1973 | Natelson . |
| 3,944,133 * | 3/1976 | Kessell et al. . |
| 3,958,753 | 5/1976 | Durland et al. . |
| 4,030,897 | 6/1977 | Pelzer et al. . |
| 4,046,317 | 9/1977 | Hein, Jr. . |
| 4,056,225 | 11/1977 | Hein, Jr. . |
| 4,262,840 | 4/1981 | Gronert . |
| 4,284,234 | 8/1981 | Rekant . |
| 4,286,748 * | 9/1981 | Bailey . |
| 4,289,270 | 9/1981 | Warsinske . |
| 4,305,546 | 12/1981 | Gropper . |
| 4,340,171 | 7/1982 | Hein, Jr. . |
| 4,670,003 | 6/1987 | Moroz . |
| 4,673,491 * | 6/1987 | Sedlaczek ............................. 494/33 |
| 4,854,933 | 8/1989 | Mull . |
| 5,222,933 | 6/1993 | Knelson et al. . |
| 5,352,037 * | 10/1994 | Jouvin ................................... 494/33 |
| 5,354,256 | 10/1994 | Knelson . |
| 5,370,600 | 12/1994 | Fitch, Jr. et al. . |
| 5,380,087 | 1/1995 | Haber et al. . |
| 5,387,174 | 2/1995 | Rochat . |
| 5,505,684 | 4/1996 | Piramoon . |
| 5,779,618 | 7/1998 | Onodera et al. . |
| 5,840,005 | 11/1998 | Lowe et al. . |

* cited by examiner

Panel 1  Panel 2

METHOD FOR SIMULTANEOUS CENTRIFUGATION OF SAMPLES

RELATED U.S. APPLICATION DATA

This application is a continuation of prior application Ser. No. 08/928,531, filed Sep. 12, 1997, now abandoned.

STATEMENT OF FEDERALLY SPONSORED RESEARCH

This invention was supported in part by grant number PØ1 HG00205 from the National Human Genome Research Institute. The U.S. Government may have certain rights in the invention.

FIELD OF THE INVENTION

This invention relates generally to centrifugation instruments and methods. More particularly, it relates to a flow-through microcentrifuge apparatus which spins samples within a rotating container.

BACKGROUND OF THE INVENTION

Centrifuges are essential instruments in any biological or chemical laboratory as they allow separation of a sample into different components based on each component's density. A typical centrifuge consists of a rotor encased in a housing. The rotor is powered by a drive motor or some other force that allows it to complete a set number of rotations or revolutions per minute (rpm). Attached to the rotor are holders in which to place sample containers, such as test tubes or well plates. These holders are placed symmetrically around the circumference of the rotor. The sample containers are balanced to ensure a symmetric mass distribution around the rotor. The sample containers are placed in the holders and each sample may then be spun and separated into various components or fractions.

Separation of the samples occurs because each component has a different density and thus a different sedimentation velocity. Sedimentation velocity is a measure of how fast a component will migrate through other more buoyant sample components as a result of the centrifugal field generated by the centrifuge.

Using centrifugation, a variety of samples can each be separated into various components. For example, specific cell organelles can be isolated, particles can be removed from a suspension, and a mixture of liquids of different density can be separated. In general, the degree of separation of components within a given sample is determined by the magnitude of the centrifugal force applied to the sample and the length of time for which the sample is spun. In turn, the magnitude of the centrifugal force is a function of the nature of the rotor used to hold the sample containers and the speed of rotation (number of rpm) of the rotor.

Centrifuges are typically fairly bulky, rectangular instruments that are positioned on the floor or on a table. They are usually able to accommodate only one type of sample container, such as a test tube or a multi-well plate (also known as a microtiter plate). The type of sample container determines the size of the centrifuge housing. For example, centrifuges for well plates are relatively large because the well plates require a lot of room during spinning. The number of samples that can be spun at one time is usually limited by size and space constraints. In addition, much time is needed to spin down samples due to large drift distance (see definition of drift distance herein below under DETAILED DESCRIPTION). Laboratory protocols that use a large number of samples normally require a lot of time for centrifugation. Lastly, before centrifugation, the sample containers must be balanced in terms of their mass and placed symmetrically around the rotor. If the rotor is unbalanced, breakage of the centrifuge can result, and the sample to be separated may be lost. Tasks associated with centrifugation are usually performed manually, although in some cases robotic arms may be available. Unfortunately, robotic arms are very expensive and require a custom designed centrifuge housing to accommodate their use.

Each centrifuge has a maximum rpm it can reach. The maximum rpm is determined by the strength of the drive motor, the mechanical strength of the rotor, and the mechanical strength of the sample containers. Low speed centrifuges, such as Beckman's KneeWell Centrifuge, can reach up to 10,000 rpm, while high speed centrifuges, such as DuPont's Sorval High Speed Centrifuge can reach up to 20,000 rpm. The rpm and rotor size used determine the centrifugal field generated, which in turn affects the sedimentation velocity of the sample components. For a given rotor, higher rpm increases the centrifugal field and the sedimentation velocity. Thus, for a given size rotor, a higher rpm decreases the amount of time necessary to spin down or separate a sample. Centrifuges often come equipped with a timer to allow automatic stoppage of rotor rotation after a set period of time.

The main limitations of centrifuges are the need for a large amount of manual labor to load and unload them, the small number of samples that can be spun down at one time, and the length of time it takes to spin down samples. In addition, the maximum acceleration used for prior art centrifuges may be limited by the mechanical strength of the sample containers, thereby increasing the amount of time needed to spin down samples. This is particularly true in the case of spinning multi-well plates using prior art systems and methods. Although at least some of these problems could be overcome by the use of robotic arms and the purchase of more centrifuges, the cost and space requirements would be prohibitive for most laboratories.

OBJECTS AND ADVANTAGES OF THE INVENTION

Accordingly, it is a primary object of the present invention to allow centrifugation of samples directly within a rotor. It is another object of the present invention to allow centrifugation of samples without a separate container. It is another object of the present invention to provide fully automated centrifugation that coordinates with multi-well plates. It is another object of the present invention to increase the centrifugal force generated by a centrifuge. Yet another object of the present invention is to allow greater acceleration of samples contained in multi-well plates than is possible using prior art centrifuges. A further object of the present invention is to decrease the amount of time necessary to centrifuge a sample. It is another object of the present invention to remove the need for balancing samples inside a rotor. It is another object of the present invention to allow resuspension of a centrifuged sample. Another object of the present invention is to provide a plurality of microcentrifuges in one device, allowing high throughput of samples. A further object of the present invention is to provide a modular centrifuge, wherein individual microcentrifuges can be added or removed. An advantage of the present invention is that it allows for microcentrifugation of a plurality of samples at high centrifugal forces, leading to substantial savings in time and cost. Another advantage of the invention is that a large number of samples can be centrifuged simultaneously using a modular centrifuge configuration powered by a single energy source.

SUMMARY OF THE INVENTION

The above objects and advantages are attained by the present invention. A container of the invention includes at least one opening, at least one chamber, and is rotated around an axis of the container. A sample in the rotating container experiences a centrifugal force as a result of the rotation. In time, the sample separates into two or more individual components based on the density of each component. Rotation of the container is achieved through the use of pressurized air, a flowing liquid, electromagnetism, or an engine. Extremely high rotation speeds (up to about 600,000 rpm) may be attained, which, in combination with a decreased drift distance, provides for a corresponding decrease in the amount of time necessary to centrifuge a given sample. In addition, the rotation speed of the container can be electronically adjusted.

The present invention can be modular, which means a number of microcentrifuge containers may be arranged in a variety of configurations and run by a single energy supply. Simultaneous centrifugation of a large number of samples can thus occur. The modular embodiment of the present invention is especially useful for centrifugation of multi-well plate samples, as the microcentrifuge containers can be placed in the same configuration as the wells of a multi-well plate.

The present invention also allows resuspension of pellets formed during centrifugation of solid-liquid mixtures. After the supernatant has been removed, the pellet remains in the chamber of the microcentrifuge container. One or more liquid reagents are added to the chamber and the container is rotated in one direction around an axis. It is then rotated in the opposite direction around the same axis. The change in velocity of the liquid produces forces which act on the pellet. The switching between rotation directions is repeated until the pellet is resuspended in the liquid. This method can be used to mix any number of solid and liquid reagents together.

The sample container of a microcentrifuge of the present invention is essentially the rotor of the microcentrifuge. The primary function of the container is to contain the sample while the container and sample are being spun, and to provide a surface on which solid particles can collect. To this end, the chamber of the container can have a double conical profile to allow more compact collection of the solid particles.

In the preferred embodiment, the container has two openings located coaxially with the chamber. The solid-liquid sample may be placed in the chamber via the inlet opening after the container has started rotating. Rotation of the container while the sample is being placed in the chamber creates drag on the sample, preventing it from falling through the chamber and outlet opening located at the other end of the container. After spinning the sample in the container, the supernatant drains out of the container through the outlet and the pellet is left in the chamber.

DETAILED DESCRIPTION OF THE INVENTION

Figure 1A:
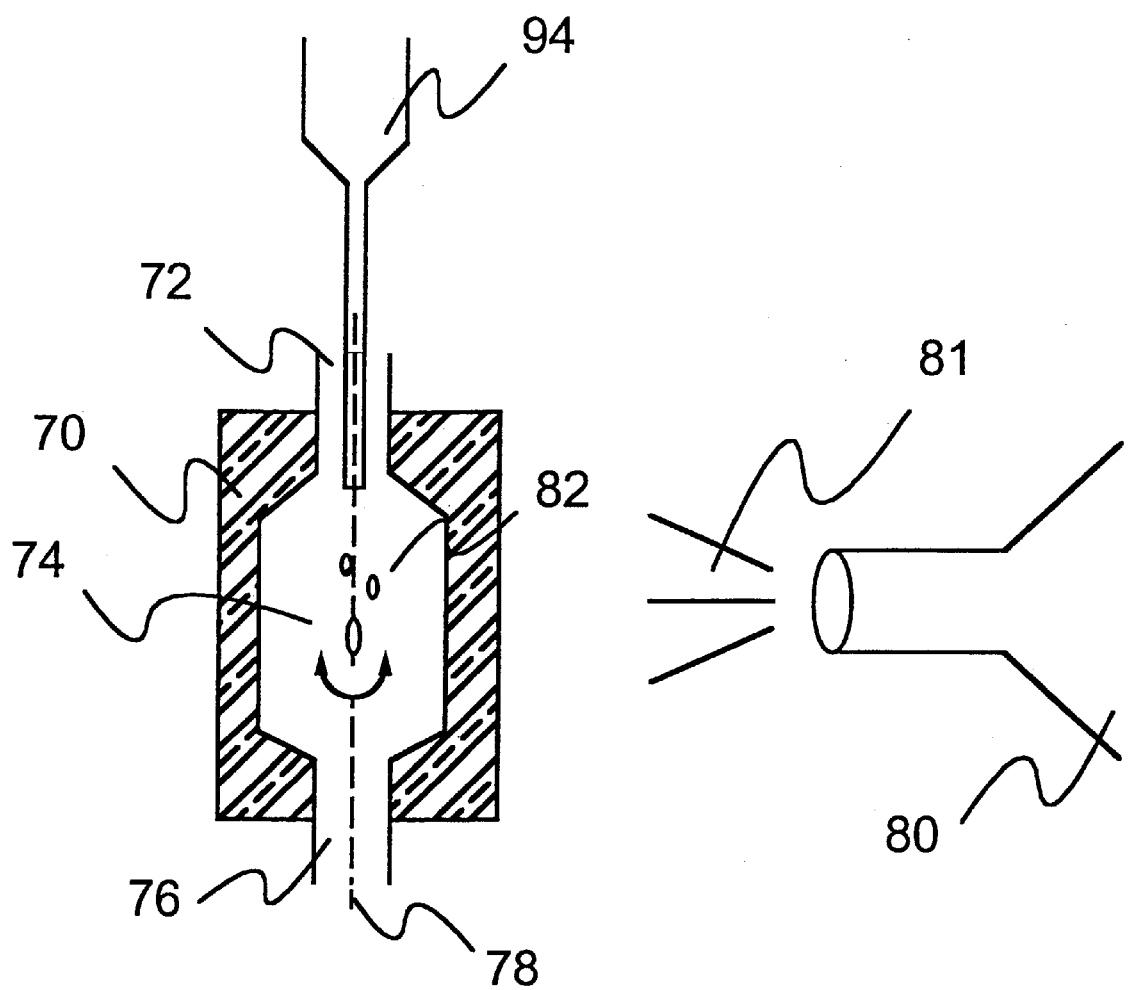
FIG. 1a is an illustration of a flow-through microcentrifuge comprising a container and a power source, according to the invention.

The preferred embodiment of the invention is shown in FIG. 1a. A container 70 comprises an inlet opening or inlet 72, a chamber 74, and an outlet opening or outlet 76, each located along an axis 78. Container 70 is positioned so it can rotate around axis 78. A pressurized air container 80, the power source, is placed perpendicular to axis 78. When pressurized air 81 is released, it rotates container 70 around axis 78. After container 70 has reached a minimum rpm, a sample 82 is placed in inlet 72. As container 70 is rotating, sample 82 experiences drag forces when it contacts the surface of inlet 72, and will not fall completely through chamber 74 and outlet 76. Sample 82 remains in chamber 74 and begins rotating around axis 78, quickly reaching the same rpm as container 70.

Figure 1B:
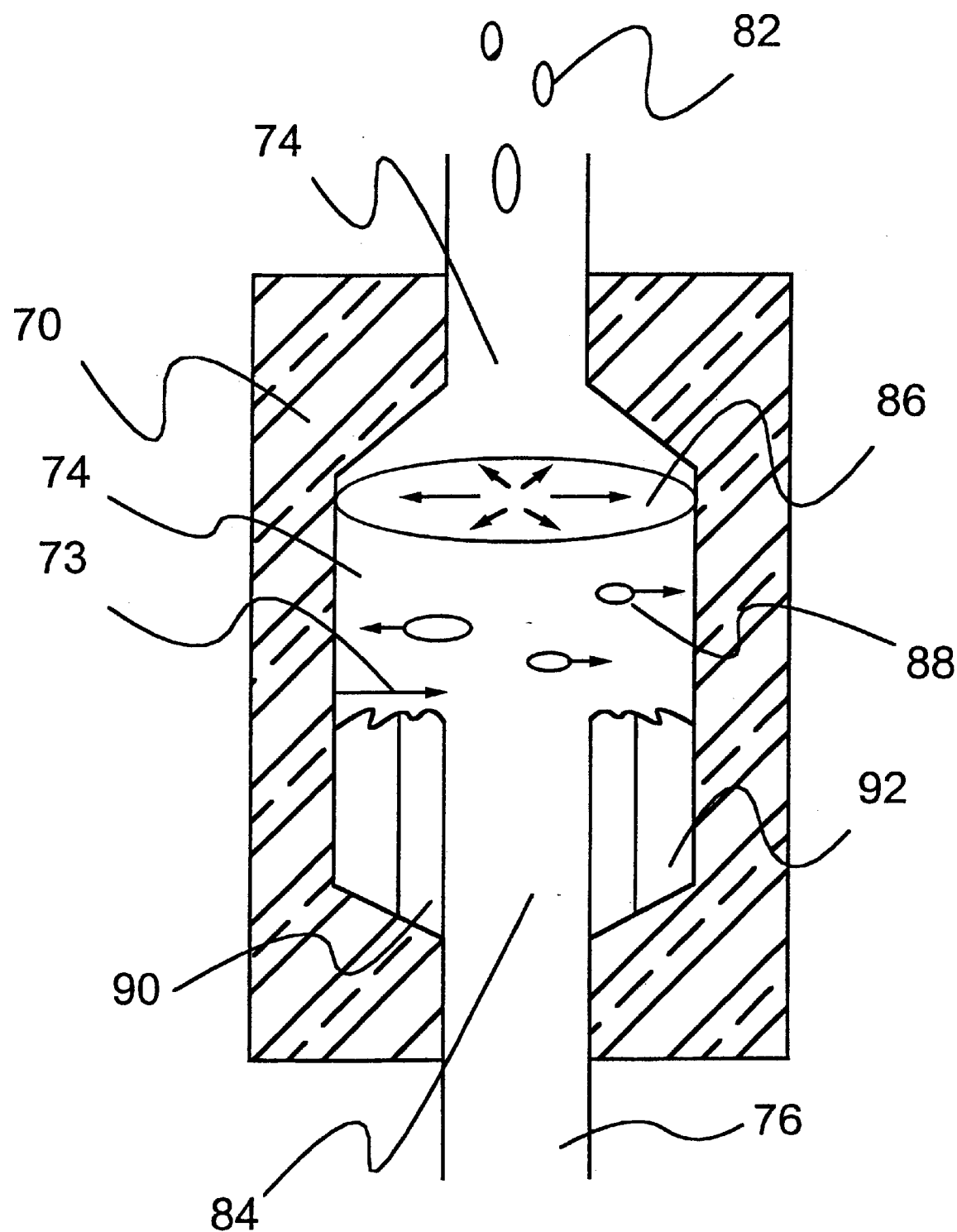
FIG. 1b is a diagram showing the centrifugal force generated by a container, according to the invention.

As is shown in FIG. 1b, a centrifugal field 86 is generated by the rotation of container 70. Centrifugal field 86 increases as the distance from the center of rotation increases, and is equal to $\omega^2 r$, where $\omega$ is the angular velocity and r is the radius, or perpendicular distance from the axis of rotation. Angular velocity is directly proportional to the rpm, so a higher speed of rotation will result in an increased angular velocity. Due to centrifugal field 86, sample 82 will experience a centrifugal force 88 per unit volume of sample equal to its density d multiplied by the centrifugal field, or $d\omega^2 r$. However, sample 82 is not homogeneous, but consists of a plurality of different components. Each component has a different density, meaning that each component will experience a different centrifugal force 88. For example, a more dense component 92 will thus migrate through a less dense component 90, allowing for separation of component 92 from component 90.

Typically, more dense component 92 is comprised of solid particles while less dense component 90 is liquid. While spinning, more dense component 92 migrates as far as possible from the center of rotation and eventually adheres to the surface of chamber 74. Less dense component 90 remains nearer to the center of chamber 74. Thus, when spinning has stopped, less dense component 90 leaves chamber 74 through outlet 76 where it can be collected. More dense component 92, which is adhered to the surface of chamber 74, e.g., in the form of a pellet 108 (FIG. 5a), is removed and also collected.

Figures 1, 2, 2A:
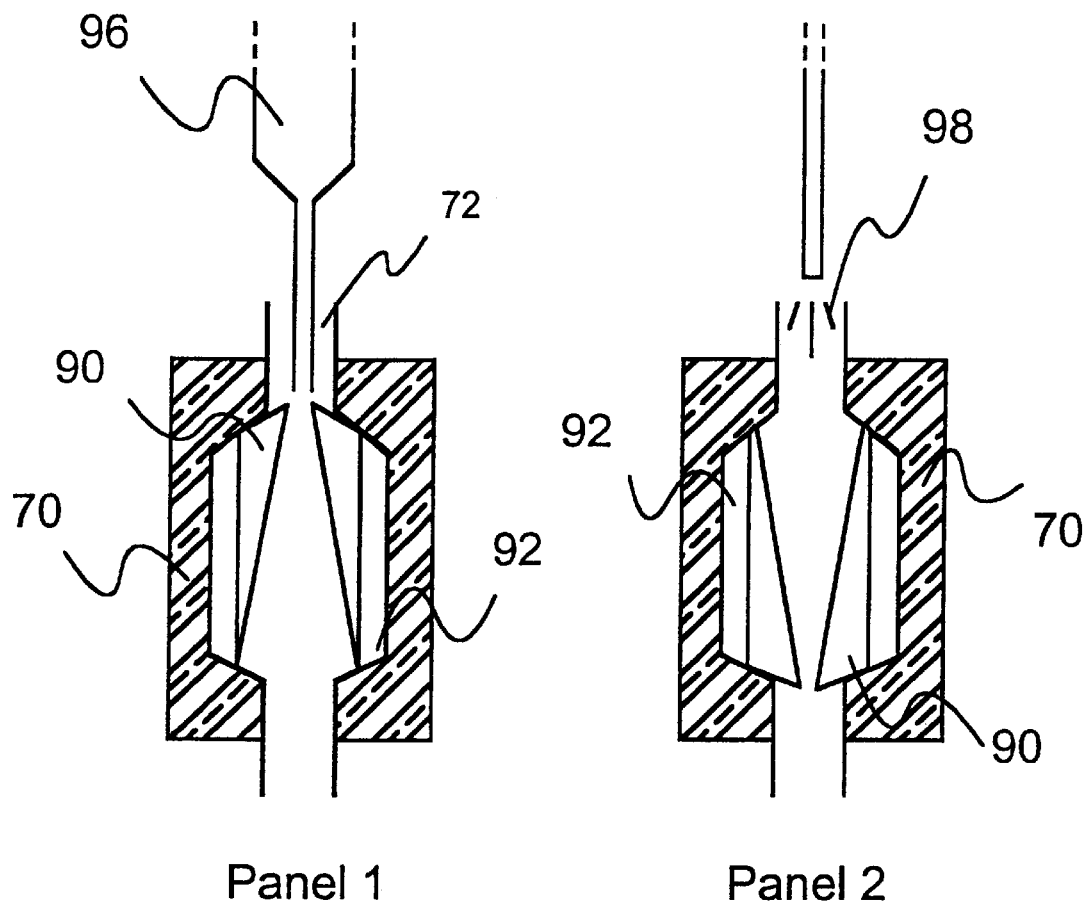
FIGS. 2a-1 and 2a-2 shows removal of a supernatant from a container by a pipette or a high velocity stream of gas.
Figure 2B:
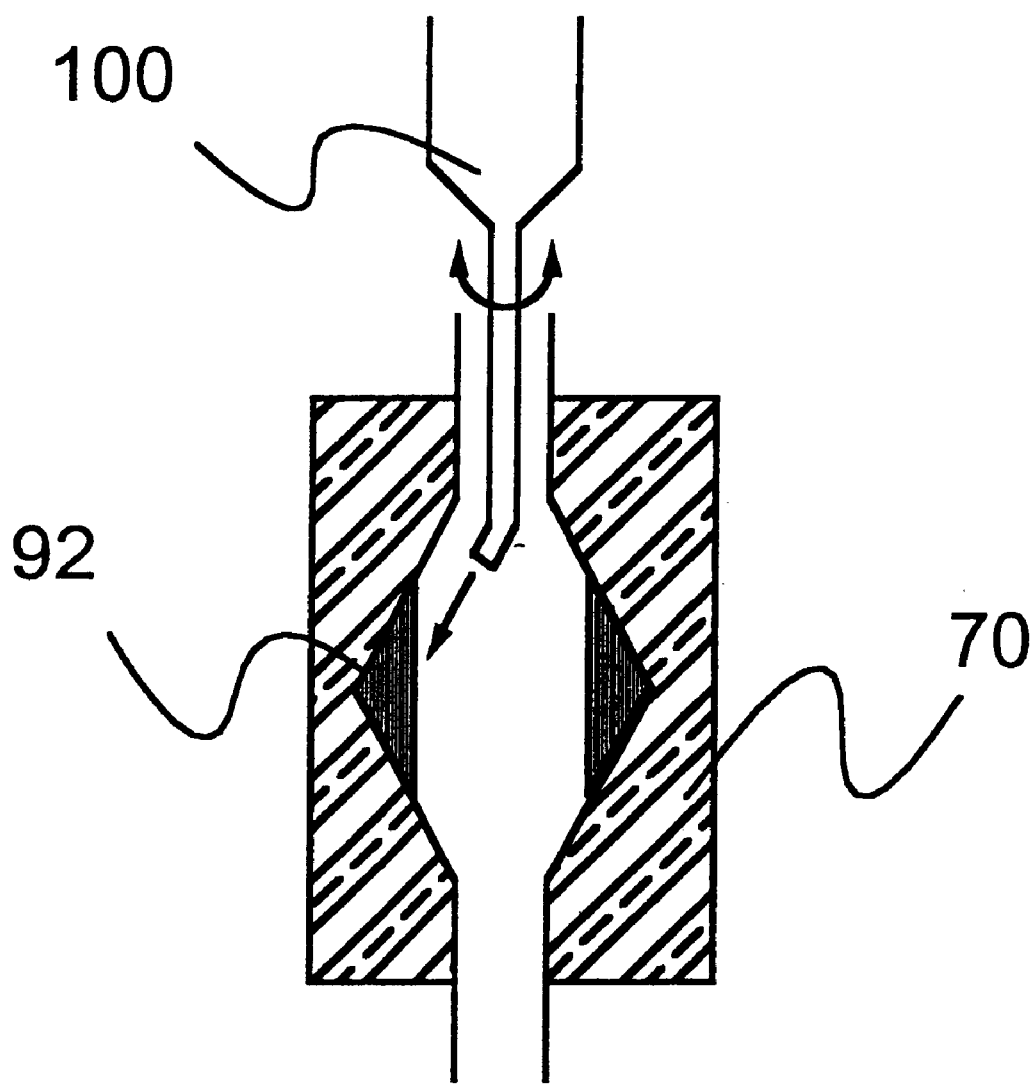
FIG. 2b shows removal of a pellet from a container by a high velocity stream of liquid or gas.

In a preferred embodiment as shown in FIG. 1a, sample 82 is injected into container 70 using a nozzle 94 or similar device. After sample 82 has been spun down, less dense component 90 will usually drain out of chamber 74, allowing for the easy collection thereof. As shown in FIG. 2a-1, less dense component 90 may also be sucked out of chamber 74 while container 70 is spinning, e.g., by using a pipette 96. Alternatively, less dense component 90 may be pushed out of chamber 74 while container 70 is spinning by using a compressed gas 98 delivered to chamber 74 FIG. 2a-2. More dense component 92, however, is more difficult to collect if it is adhered to the surface of chamber 74. FIG. 2b shows how more dense component 92 can be removed by a high velocity stream 100 of liquid or gas. More dense component 92 can also be removed by resuspension, as is described fully hereinbelow (with reference to FIG. 9).

Centrifugal acceleration is dependent on rotational speed (rpm) and the size of the rotor used. Container 70 can reach very high rotation speeds, preferably up to about 30,000 rpm, more preferably up to about 120,000 rpm, and most preferably up to about 600,000 rpm. According to one embodiment of the invention, a rotational speed of about 600,000 rpm of container 70 corresponds to a centrifugal force of about 1,500,000 g. TABLE 1 shows the maximum useable rpm and centrifugal accelerations of various prior art centrifuges. Thus it is evident that, in comparison with the prior art, much higher centrifugal acceleration may be attained with the flow-through microcentrifuge of the instant invention.

TABLE 1

| CENTRIFUGE | MAX RPM | MAX ACCELERATION OF MULTI-WELL PLATES |
|---|---|---|
| Beckman Low Speed | 6,000 | <3500 g |
| Beckman KneeWell | 6,400 | <3500 g |
| Beckman High Speed | 21,000 | <3500 g |
| DuPont Sorval TableTop | 3,200 | <3500 g |
| DuPont Sorval High Speed | 20,000 | <3500 g |
| IEC Centra 7 Table Top | 3,000 | <3500 g |

In the case of multi-well plate containers used in centrifuges of the prior art, maximum accelerations that may be used are limited by the mechanical weakness of the plate. In addition, most sample holders used with known centrifuges cannot withstand forces of the magnitude which may be generated by the flow-through microcentrifuge of the present invention. Well plates (e.g., 114a, 114b, FIG. 7) are usually constructed from acrylic or various plastics. These materials are not very strong and cannot withstand ultra-high centrifugal accelerations. Individual sample holders that are mechanically strong, such as certain test tubes or centrifuge tubes, can be used at such high accelerations. However, centrifugation of individual samples would take a very long time and is impractical for laboratory protocols which require centrifugation of a large number of samples.

The present invention does not spin sample holders, merely samples 82. As a result, very high rpms (revolutions per minute) and ultra-high centrifugal accelerations are possible. Unlike glass and plastic, most biological and chemical matter can withstand such forces. At such high rpms, component 92 sediments much faster due to the generation of a much higher centrifugal force, resulting in considerable saving of time.

With reference to FIG. 1b, the time necessary to separate out components 90 and 92 of sample 82 is also decreased, as compared to prior art centrifuges, due to a reduction in drift distance 73. Drift distance 73 is defined as the distance from an air channel 84 to the surface of chamber 74. Drift distance 73 is the maximum distance through which components 90 and 92 of sample 82 can migrate during centrifugation. Because the sample depth in container 70 of the present invention is so much smaller than the sample depth in sample containers of the prior art, drift distance 73 is greatly decreased. Thus component 92 has a shorter distance to migrate, which reduces the time needed for centrifugation.

Figures 5A, 5B:
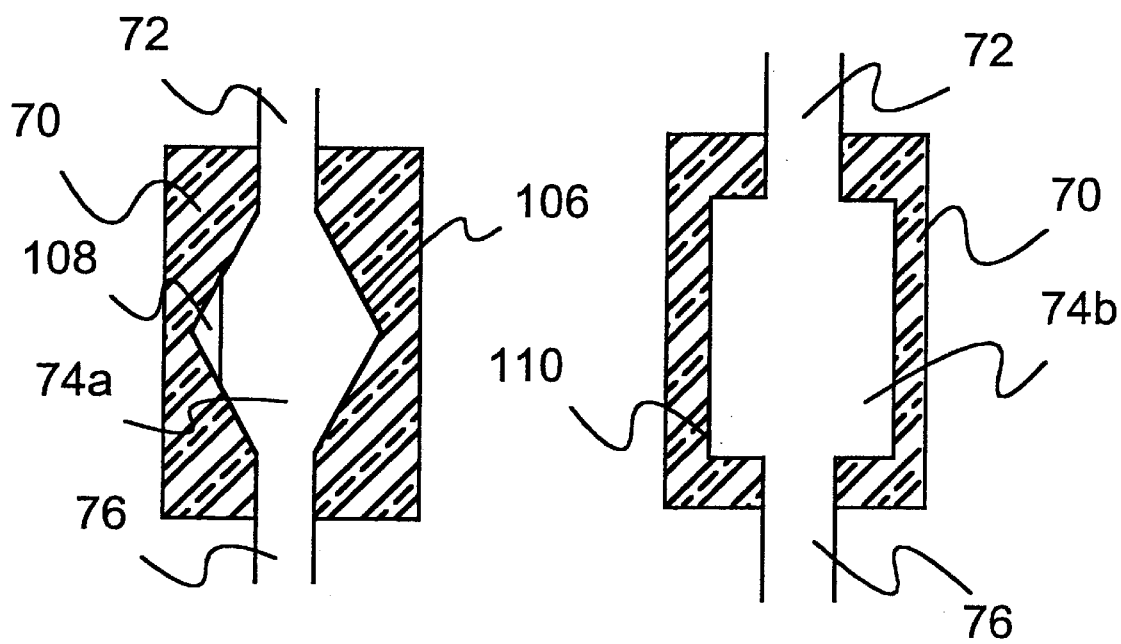
FIG. 5a is a diagram showing a cross-section of a container having a chamber with a double conical shape.
FIG. 5b is a diagram showing a cross-section of a container having a substantially cylindrical shape.

The flow-through microcentrifuge of the present invention can accommodate all types of samples. Solid-liquid and liquid-liquid mixtures can easily be separated. For solid-liquid separations, the liquid will form the supernatant, while the solid will form pellet 108 (FIG. 5a). For liquid-liquid separations, inner and outer bands of each liquid will form based on their respective densities.

Figure 3:
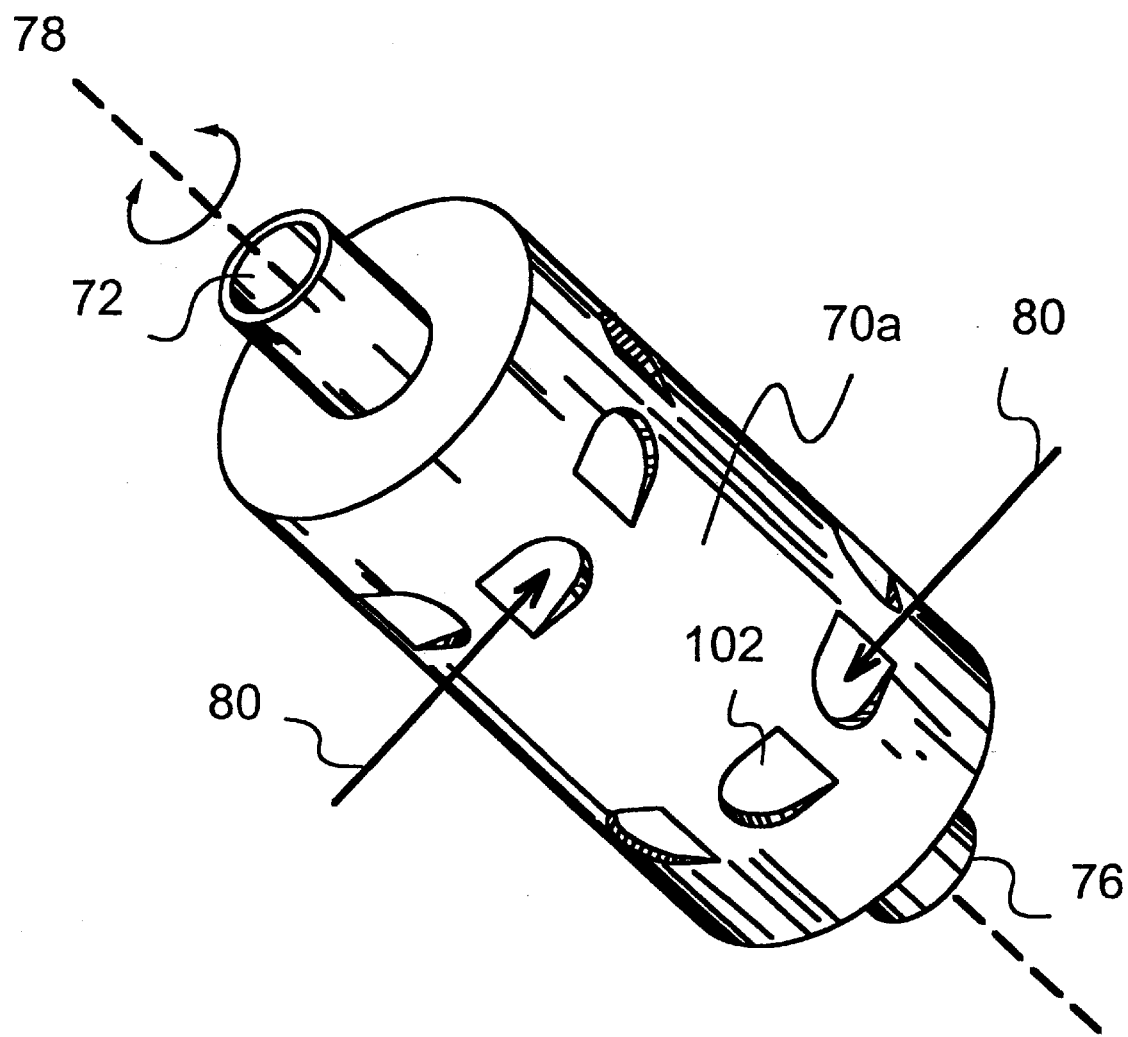
FIG. 3 is a right isometric view of a container showing surface indentations on the exterior of the container for promoting rotation of the container.

Container 70 can vary in structure depending on its intended purpose. According to the embodiment of FIG. 3, a container 70a may be used when the flow-through microcentrifuge is powered by pressurized air 80 (see FIG. 1a). Container 70a has surface indentations 102 that facilitate the transfer of momentum from pressurized air 80 to container 70a, resulting in rotation of container 70a. Surface indentations 102 may be located uniformly around axis 78 of container 70a. It should be noted that surface indentations 102 run in two directions, which allow for rotation of container 70a in both directions around axis 78. The velocity of pressurized air 80 can be easily adjusted, for example by a computer, allowing adjustment in the rpm of container 70a. Container 70a can also be used if the flow-through microcentrifuge is powered by a flow of liquid.

Other embodiments of container 70 are within the scope of the invention. When container 70 is powered by means other than by the flow of a fluid, container 70 may be adapted accordingly to allow container 70 to be rotated at high speeds. As an example, container 70 may be powered by an electromagnetic force, container 70 having a magnetic coating which moves in concert with container 70. Or, container 70 which is powered by an engine can be connected through gears or belts to the engine. Other structural features can be added to container 70 in order to facilitate centrifugation of sample 82, as may be evident to one skilled in the art in light of the teachings herein.

Figure 4A:
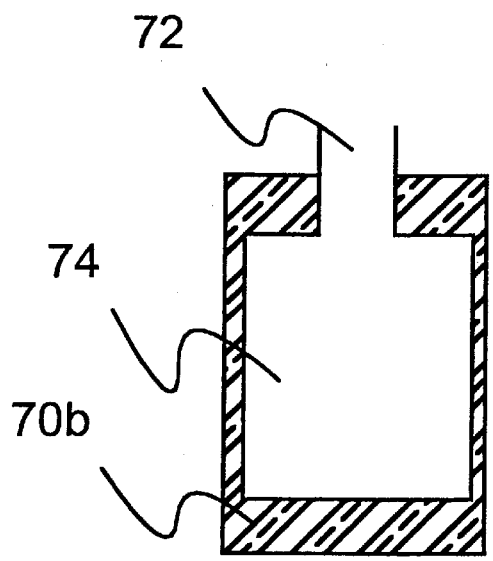
FIG. 4a is a diagram showing a cross-section of a container with a single opening used as both an inlet and an outlet.

According to the preferred embodiment shown in FIG. 1a, container 70 includes inlet 72 and outlet 76. In this embodiment, sample 82 enters container 70 through inlet 72, is separated in chamber 74, and exits through outlet 76. In contrast, FIG. 4a shows another embodiment of the invention, in which container 70b has inlet 72, but lacks outlet 76 (FIG. 1a). When using container 70b, there is no need to begin rotation before adding sample 82, since there is no outlet from which sample 82 can drain. After separation, separated components may be removed via inlet 72. Typically, this is achieved using pipette 96, compressed gas 98, or some other means (FIGS. 2a-1, 2a-2, and 2b).

Figure 4B:
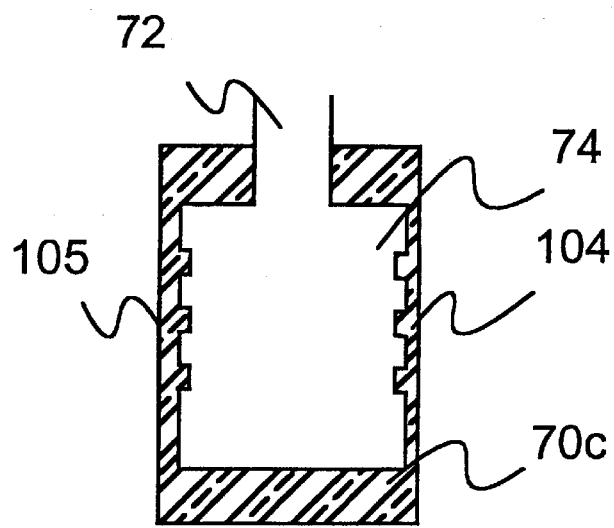
FIG. 4b is a diagram showing a cross-section of a container with an inlet and a plurality of outlets covered by a selective membrane.

FIG. 4b shows another embodiment of the invention, wherein container 70c, is well adapted for the high speed separation of solid-liquid mixtures. Container 70c includes inlet 72 and chamber 74, as for containers 70 and 70a. However, in contrast to container 70, container 70b lacks single outlet 76 (FIG. 1a), but instead comprises a plurality of outlets 104 which are located at separate locations on the side walls of container 70c. To use a simple analogy, container 70c operates in a similar manner to a conventional top-loading automatic washing machine on the spin cycle. While spinning, sample 82 will tend to leave container 70c through outlets 104. A selective membrane 105 can be placed over outlets 104, allowing only certain parts or components of sample 82 to pass therethrough. Selective membrane 105 thus determines which components of sample 82 are collected outside chamber 74 and which are collected inside chamber 74.

In the case of container 70 having both inlet 72 and outlet 76, chamber 74 can have a variety of shapes. With reference to FIG. 5a, in a preferred embodiment, chamber 74a comprises a double conical profile or shape 106. Double conical shape 106 has its maximum diameter located at a unique position at or near the center of chamber 74a. When using chamber 74a to separate a solid-liquid mixture, the solid or more dense component 92 (not shown) will collect against the sides of chamber 74a at its longitudinal midpoint, resulting in formation of pellet 108. Chamber 74a can be used when it is very important to maintain purity of the supernatant, because the design and features of chamber 74a foster the formation of a compact pellet 108, thereby reducing the surface area of pellet 108 and thus its contact with the supernatant.

Another variation of chamber 74 is shown in FIG. 5b in the form of chamber 74b. Chamber 74b is substantially cylindrical, having walls 110 that run parallel along the length of container 70, thus providing a constant or substantially constant internal diameter of chamber 74b. Chamber 74b can be used to separate both solid-liquid and liquid-liquid solutions. Chamber 74b is less likely to maintain the integrity of a pellet, or the purity of components 90 and 92 (not shown) after their separation from a mixture. However, the design of chamber 74b facilitates the collection of more dense component 92 in situations where more dense component 92 has adhered to the surface of chamber 74b.

Ideally, container 70 is constructed from a non-reactive or inert material. This is especially important for biological and chemical protocols which may use labile or sensitive components or reagents. Titanium is the preferred material, as it is strong but relatively inert. Container 70 can be made entirely out of titanium, or can be constructed out of another material and coated with titanium. Fluoropolymers, such as Teflon, are other good coating materials. Other possible materials for container 70 include stainless steel, aluminum, acrylic, or various plastics.

The flow-through microcentrifuge of the present invention (as shown in FIG. 1a) is considerably smaller than most prior art centrifuge models. While prior art centrifuges may be as large as, or larger than, conventional washing machines, container 70 of the present invention normally will have a diameter of less than 20 cm. Preferably container 70 has a diameter in the range of from about 3 mm to about 5 cm, more preferably from about 5 mm to about 12 mm, and most preferably from about 8 mm to about 19 mm in diameter. One advantage of the relatively small size of centrifuges of the present invention is a correspondingly small mass, which means each centrifuge of the invention needs considerably less energy for rotation as compared with most prior art centrifuges. Even when spun at very high rpm the flow-through microcentrifuge consumes less energy than a prior art centrifuge spinning at much lower rpm.

The small size and low energy consumption of the present invention allow for the simultaneous use of a large number of flow-through microcentrifuges, ideally using only a single energy supply. One application of a multiple flow-through microcentrifuge configuration is to spin down multi-well plate samples. In the case of prior art centrifuges, multi-well plates are placed in elaborate holders attached to the centrifuge rotor and revolved around the rotor. Any solid particles collect at the bottom of each well as a pellet, leaving the supernatant behind. After spinning has stopped, the plates are removed from the centrifuge holders. The supernatant and/or the pellet may then be removed from the wells.

Figure 6:
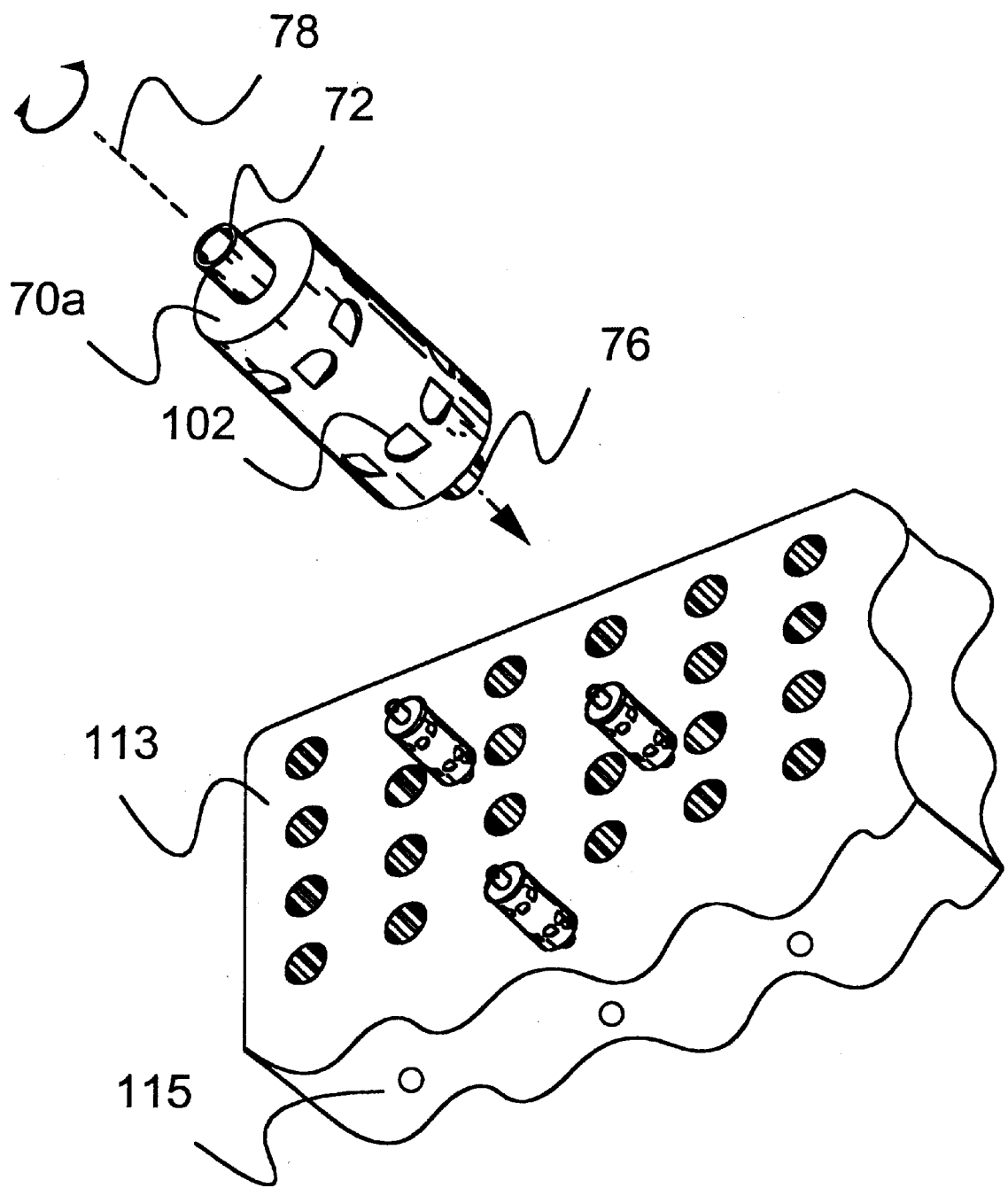
FIG. 6 is a right isometric view of a container of the present invention shown in relation to a container holder for use in conjunction with a multi-well plate.
Figure 7:
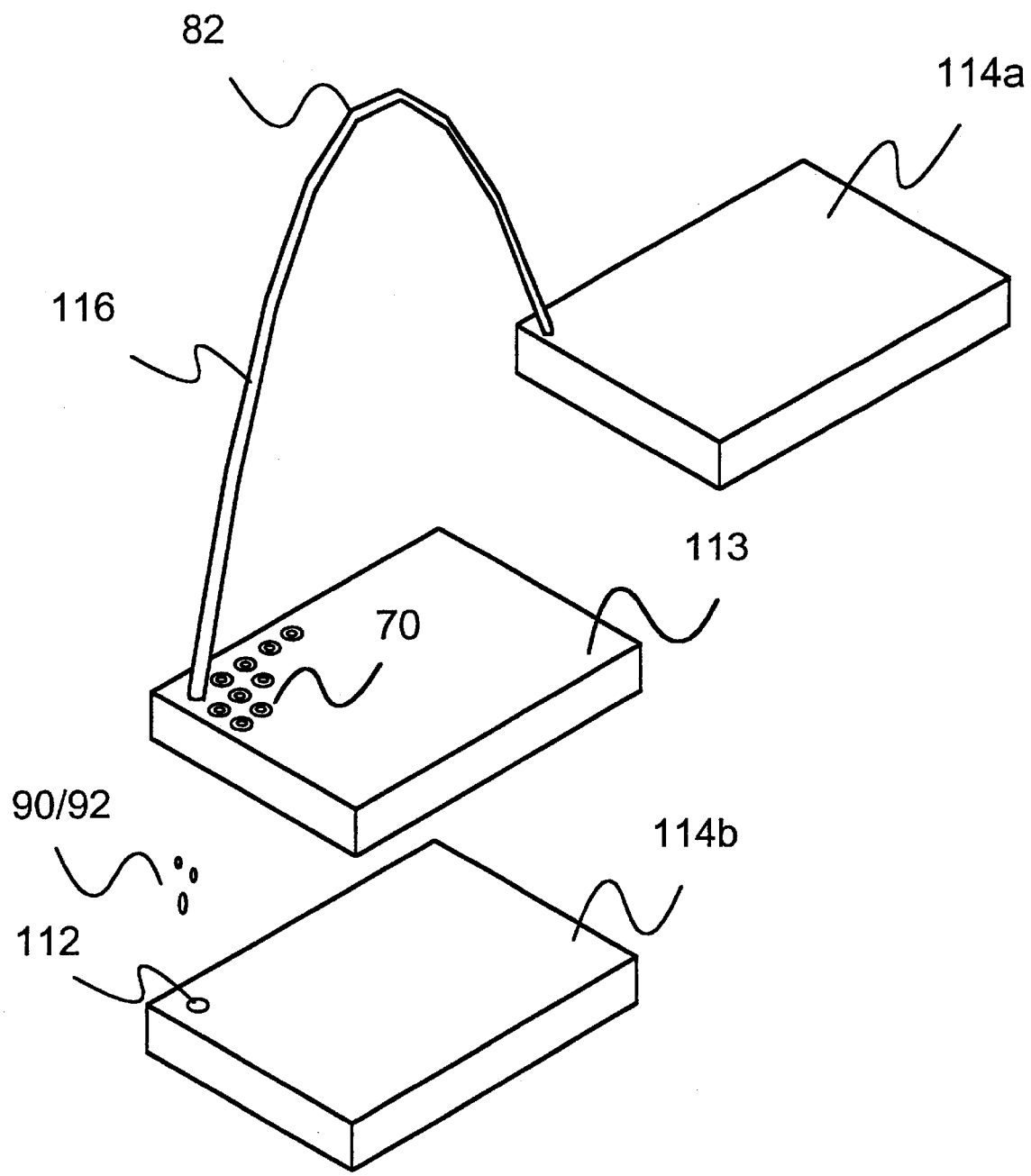
FIG. 7 illustrates a container holder for use in a preferred method for centrifuging multi-well plate samples.

According to one embodiment of the present invention, as shown in FIG. 6, flow-through microcentrifuge container 70 has dimensions adapted for placement of each container 70 in a socket of a microcentrifuge container holder 113. For example, container 70 may have a diameter of about 8.5 mm, while chamber 74 may have a diameter of about 7.5 mm. As can be seen from FIG. 6, a substrate of holder 113 has a plurality of sockets therein, the plurality of sockets being arranged in a grid, wherein the socket grid of holder 113 corresponds with the arrangement or grid of wells 112 of a multi-well plate (e.g. 114a, 114b, FIG. 7). That is to say, holder 113 has the same number and arrangement of sockets as the wells of a multi-well plate 114a, 114b, such that each well of a multi-well plate is vertically aligned with a socket of holder 113 when plate 114a, 114b and holder 113 are sandwiched together in a horizontal orientation. As illustrated in FIGS. 6 and 7, container holder 113 defines a thickness such that each container 70 is disposed substantially within the thickness of container holder 113 (see, e.g., FIG. 7). During centrifugation, container holder 113 remains stationary or fixed relative to each of containers 70.

A plurality of containers 70 may be used with holder 113, such that each well 112 of a multi-well plate (e.g. 114a, 114b), or any number of wells of a multi-well plate, has a corresponding container 70 aligned therewith (FIG. 7). Microcentrifuge container holder 113 is adapted such that each container 70 in holder 113 may be located directly above or below a well of multi-well plate 114a, 114b, thereby facilitating transfer of sample 82 from container 70 to well 112, or from well 112 to container 70. (Only a single well 112 is shown in plate 114b of FIG. 7 for the sake of simplicity.) Microcentrifuge container holder 113 includes air ducts 115 to allow entry of pressurized air 80, pressurized gas, or other power source, to drive each of containers 70 at high rotational speeds.

According to one embodiment, as shown in FIG. 7, plate 114a is located at a distance from flow-through microcentrifuge container holder 113. Samples 82 are transferred from a number of wells 112 to their respective containers 70 by use of tubes 116 (only a single such tube 116 is shown in FIG. 7 for the sake of clarity). After containers 70 have stopped spinning, the supernatant drains from outlet 76 (not shown) into wells 112 of an identical multi-well plate 114b. Subsequently, pelleted components of samples 82 may then be removed, as required.

The modularity of the flow-through microcentrifuge enables a user to devise many different centrifugation configurations. For example, if only 80 wells 112 of multi-well plate 114a contain samples 82, then only 80 containers 70 corresponding to the 80 wells 112 are rotated in holder 113. Likewise, if only every other well 112 of multi-well plate (114a) contains samples 82, only corresponding containers 70 are used in holder 113.

As the present invention does not need to consider the size and shape of the sample container, samples 82 from all sample containers can be spun down. Samples 82 in test tubes, petri dishes, and flasks can be transferred directly from their sample containers to microcentrifuge containers 70. In, the flow-through microcentrifuge of the present invention, each sample 82 is being spun individually and equilibrates itself when it is added to container 70, wherein the step of balancing the centrifuge is obviated.

The amount of sample 82 that can be spun down depends on the volume or capacity of chamber 74. In the preferred embodiment, chamber 74 can hold about 400 $\mu$L of sample 82. A small amount of volume is lost due to the formation of air channel 84, (FIG. 1b). The dimensions of chamber 74 can be adjusted according to the user's needs.

Figure 8A:
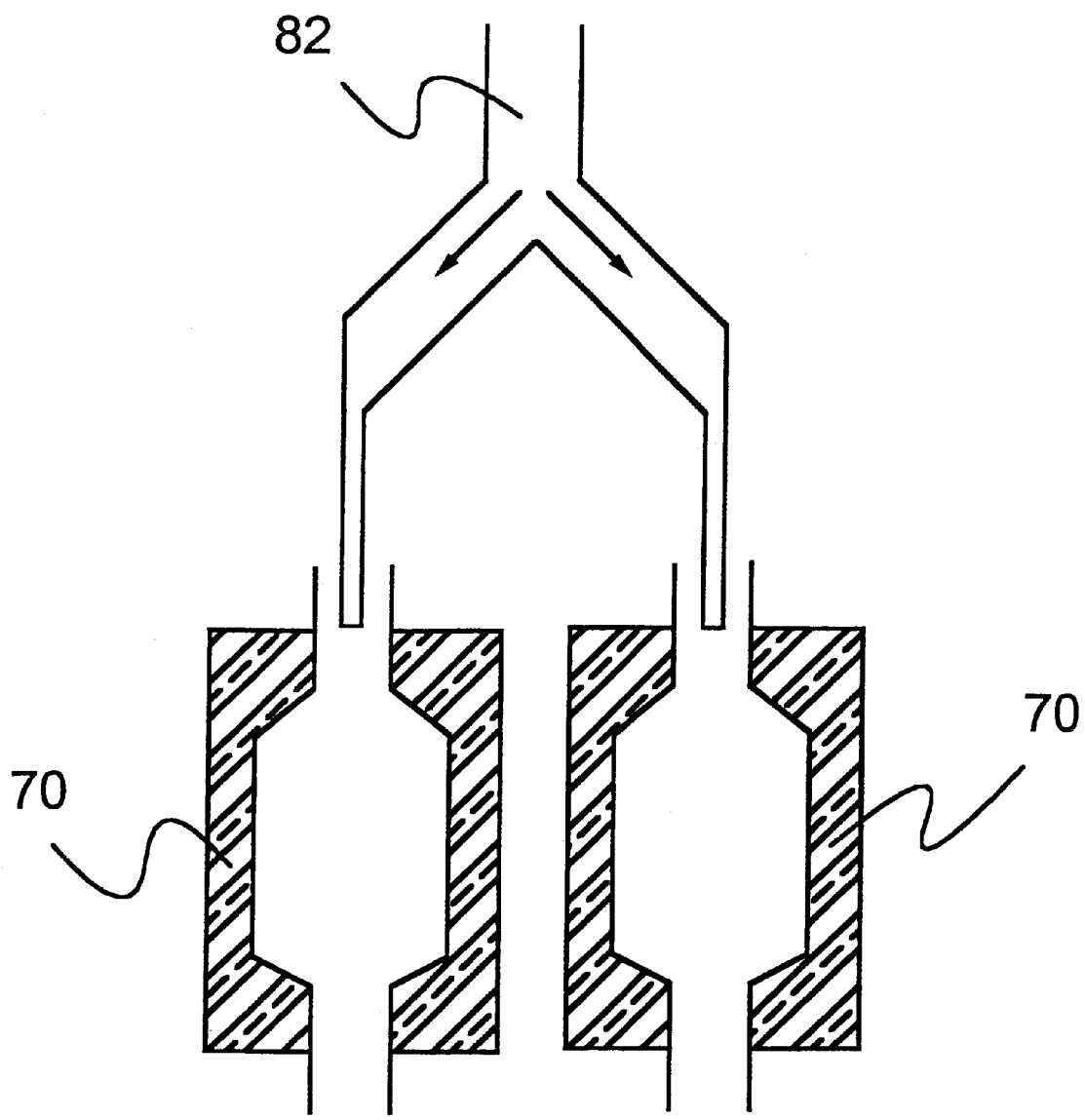
FIG. 8a is a diagram of a method which uses two microcentrifuges per sample.
Figure 8B:
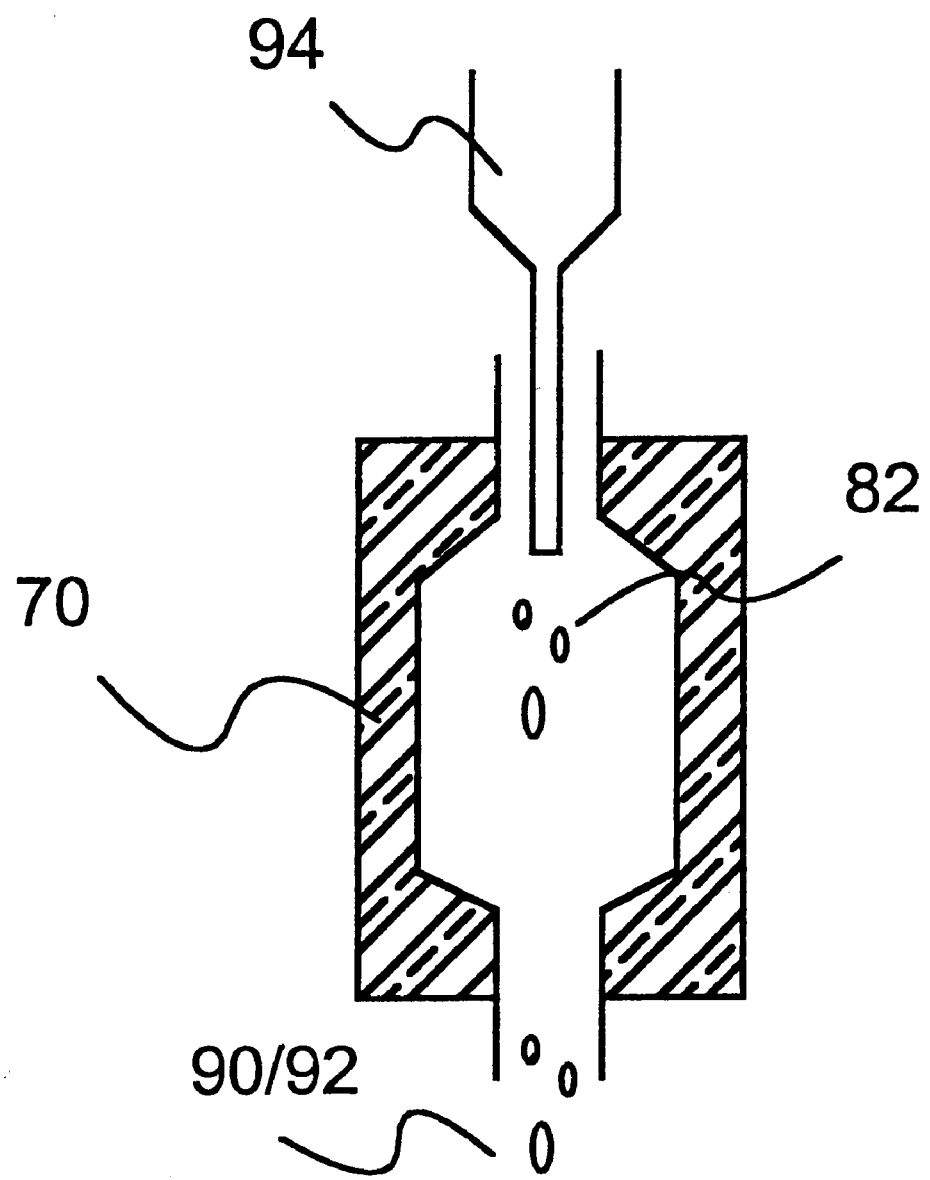
FIG. 8b is a diagram of a method which uses a single centrifuge container and a series of centrifugation steps per sample.

If the volume of sample 82 exceeds the capacity of container 70, two or more possible flow-through microcentrifuge configurations can be set up. In the first configuration, as shown in FIG. 8a, two or more containers 70 are used per sample 82. Part of each sample 82 is transferred to each container 70, e.g., using pipette 96, nozzle 94, or tubes 116 (FIGS. 1a, 2a, 7). Samples 82 are spun simultaneously, and components 90 and 92 are removed as described above. In the second configuration, as shown in FIG. 8b, only one container 70 is used. A first aliquot of each sample 82 is transferred to container 70, container 70 is rotated at a high speed to spin down sample 82, and components 92 and/or 90 are removed. Then a second aliquot of sample 82 is transferred to the same container 70, sample 82 is spun down once again, and components 92 and/or 90 are again removed. The process is repeated until the whole of sample 82 has been separated.

Figure 9:
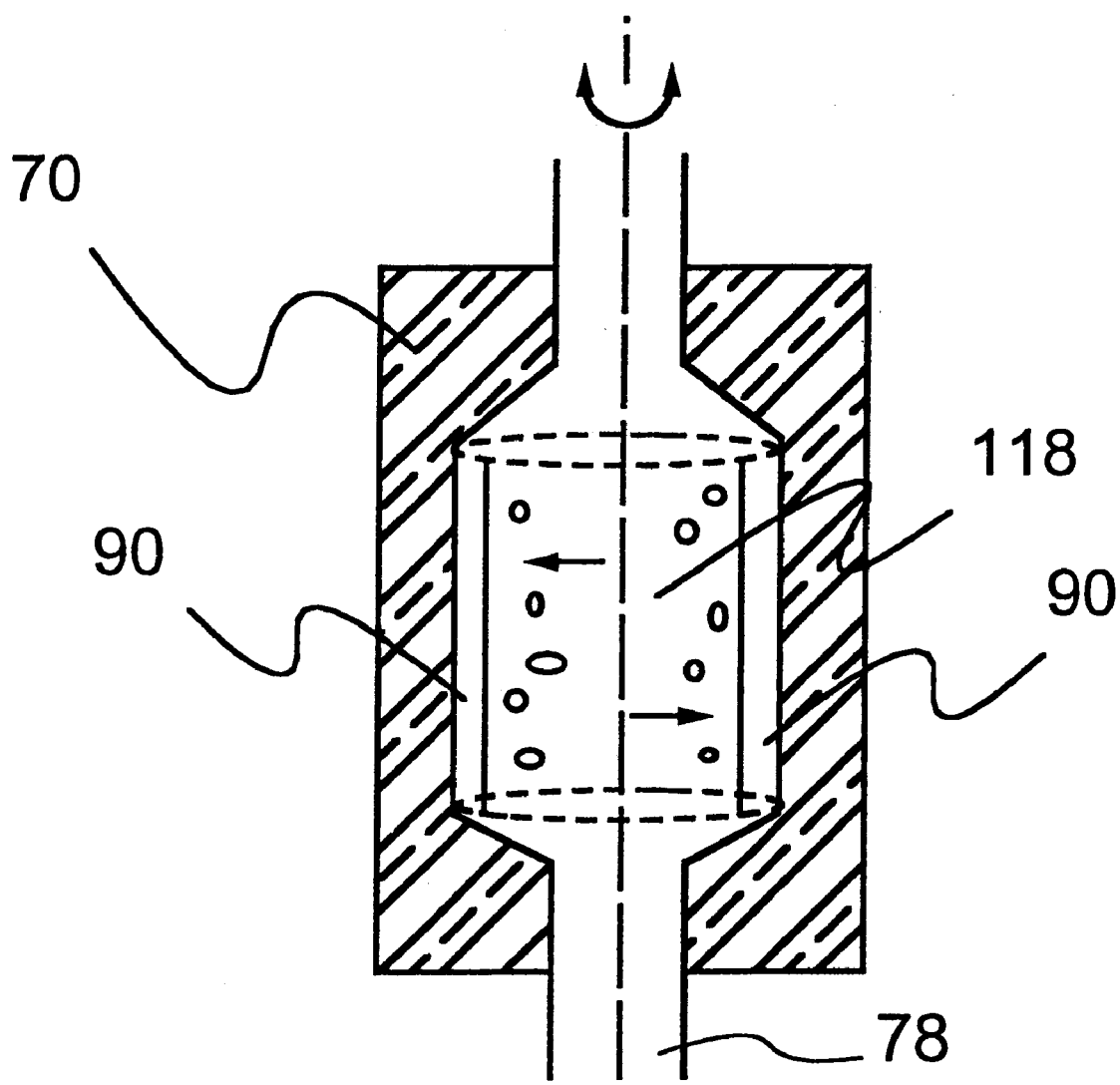
FIG. 9 illustrates a method of resuspending a pellet according to the present invention.

Spinning of container 70 around axis 78 lends itself to applications other than centrifugation. For example, resuspension of more dense components, e.g., component 92, is easily achieved. As shown in FIG. 9, more dense component 92 is collected on the surface of chamber 74 in container 70. After container 70 has begun to rotate in one direction, a liquid reagent 118 is added. Container 70 can then be rotated in the opposite direction around axis 78. More dense component 92 will experience forces due to changes in the velocity of liquid reagent 118, causing more dense component 92 to break apart. After continued rotation in alternate directions, more dense component 92 will be suspended in liquid reagent 118. The embodiment of container 70b (FIG. 4a) is particularly well suited for this type of application.

The present invention may also be used for the convenient mixing of two or more reagents 118, as illustrated in FIG. 9. Two or more reagents 118 can be liquids, solids, or any combination of the two. If container 70 has outlet 76 as well as inlet 72, rotation of container 70 can be started before reagents 118 are placed in container 70. While the two or more reagents 118 are spinning in chamber 74, rotation of container 70 may be switched from one direction to the opposite direction around axis 78. This step can be repeated until reagents 118 are thoroughly mixed. This embodiment of the invention thus includes the same general function as a traditional laboratory vortex instrument.

Container 70, tubes 116, and all other parts of the microcentrifuge can be easily cleaned, e.g., using water and/or a detergent, and the apparatus reused. If sterility is necessary, all parts of the microcentrifuge can be sterilized, e.g., by treatment with ethylene oxide or by autoclaving.

EXAMPLES

Example 1

During single stranded DNA (ss DNA) sequencing protocols, samples of cells containing the DNA are pelleted by centrifugation prior to isolation and purification of the DNA. The following TABLE 2 shows data from prior art 96 well plate centrifugation, and prior art microcentrifugation, as compared with flow-through microcentrifugation of the present invention.

TABLE 2

| TYPE OF CENTRIFUGA-TION | 96 WELL PLATE CENTRIFUGA-TION | PRIOR ART MICRO-CENTRI-FUGATION | FLOW-THROUGH MICRO-CENTRI-FUGATION |
| --- | --- | --- | --- |
| TIME | 30 minutes | 10 minutes | 5 minutes |
| ACCELERA-TION | 3,000 g | 11,000 g | 20,000 g |
| OPTICAL DENSITY OF DNA (purity)$^{-1}$ | Variable | 0.393 | 0.341 |

It can be seen from TABLE 2 that, in comparison with prior art methods and devices, centrifugation using apparatus of the present invention increases acceleration, and decreases the time needed for centrifugation, while achieving essentially the same purity level for the ss DNA.

Example 2

DNA sequencing protocols usually sequence DNA inserts within plasmids. According to such protocols, bacterial cells containing the plasmids are broken and the plasmids are isolated from other cellular components by various purification techniques. The following TABLE 3 shows comparative data for this step obtained by prior art 96 well plate centrifugation, prior art filter-based isolation, and flow-through microcentrifugation of the invention.

TABLE 3

| TYPE OF PURIFI-CATION | 96 WELL PLATE CENTRI-FUGATION | FILTER-BASED PURIFI-CATION | FLOW-THROUGH MICRO-CENTRI-FUGATION |
| --- | --- | --- | --- |
| TIME | 30–60 minutes | 30 minutes | 30 minutes |
| COST OF REAGENTS AND DISPOSABLES PER WELL | $2.00 | $2.00 | $0.02 |
| LEVEL OF AUTOMATION | all manual | Mostly automatic | All automatic |
| QUALITY OF SAMPLE | adequate for sequencing (see FIG. 10a) | Sometimes adequate for sequencing | Adequate for sequencing (see FIG. 10b) |

Figure 10A:
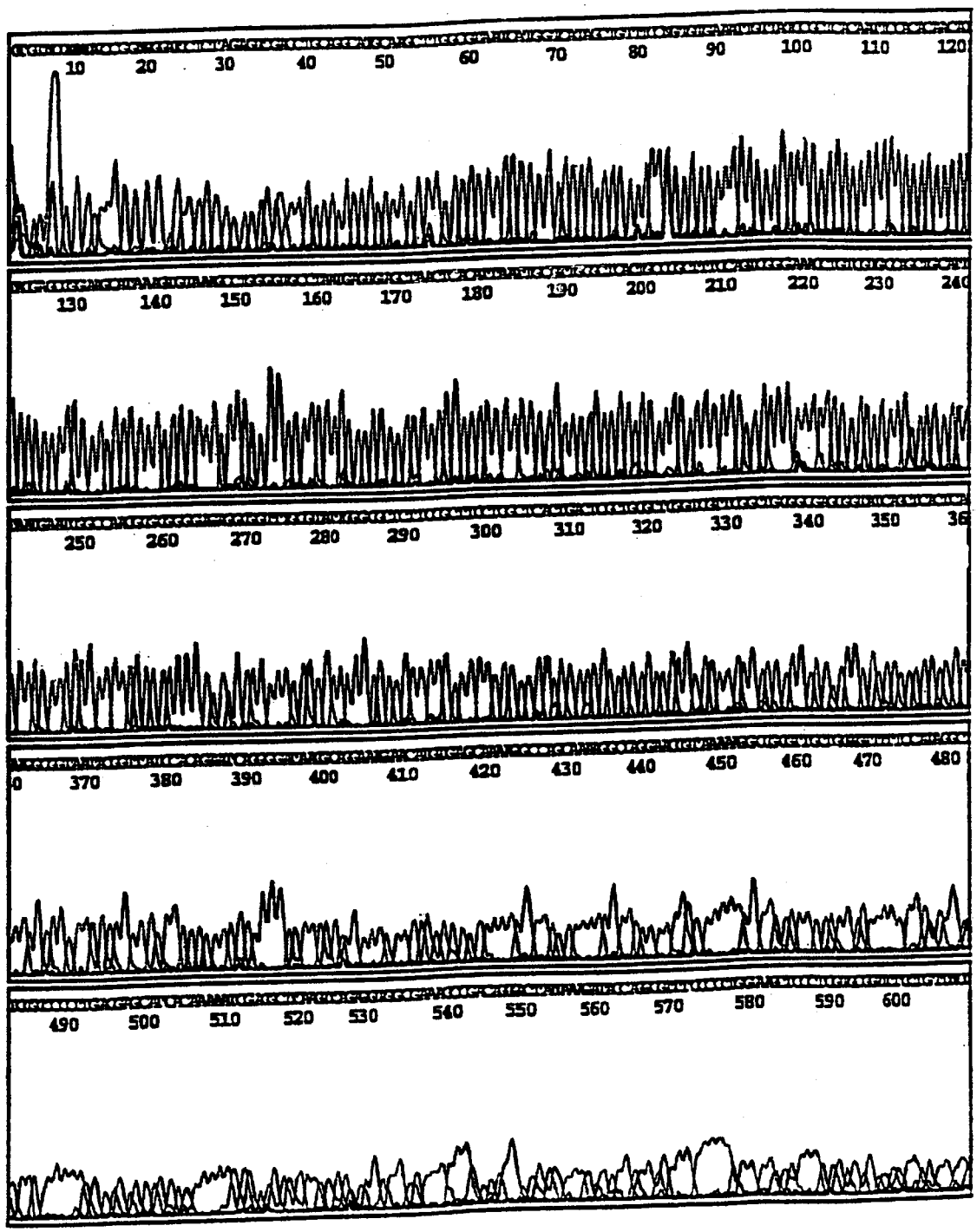
FIG. 10a shows sequence data taken from single stranded DNA purified using a prior art centrifuge.
Figure 10B:
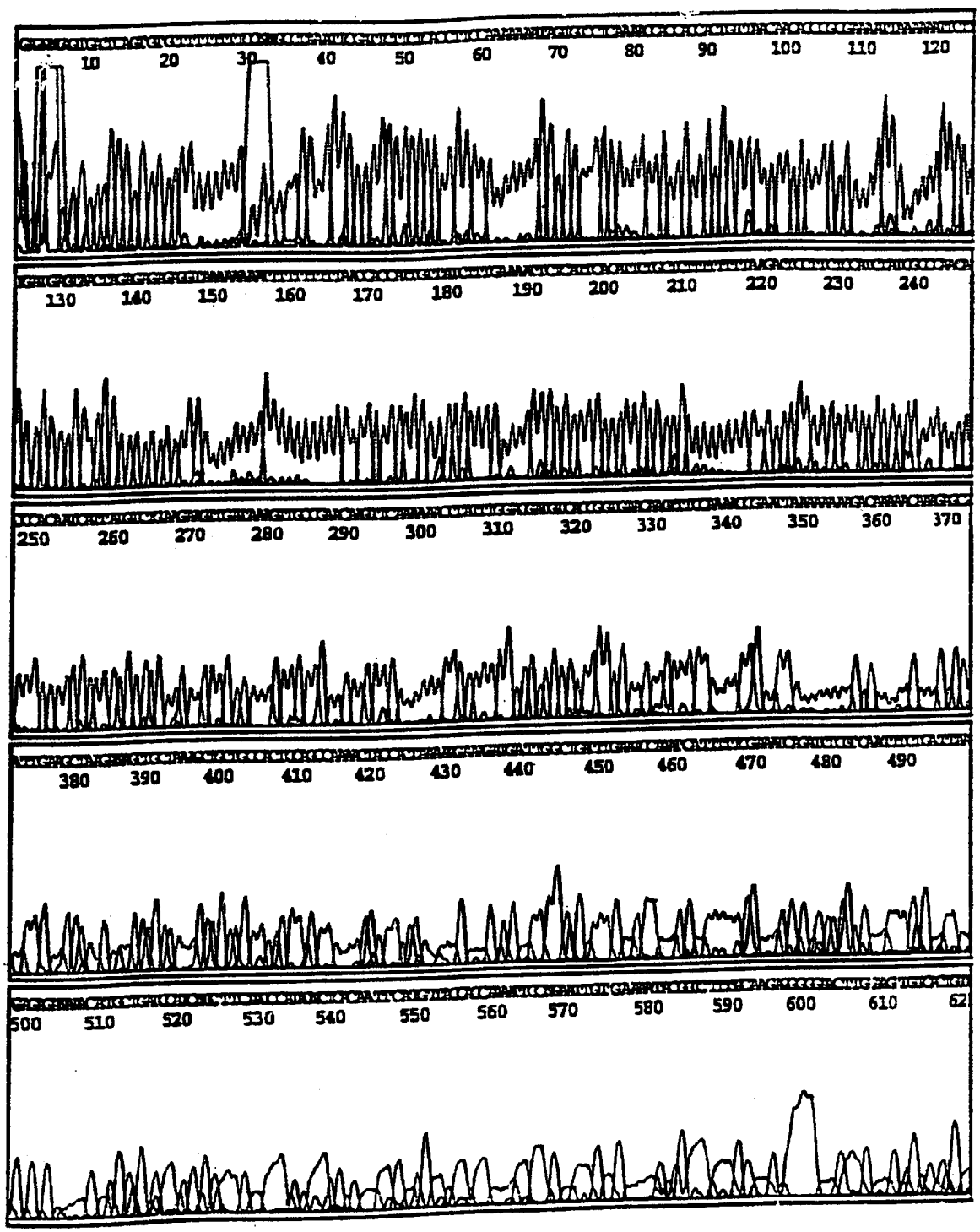
FIG. 10b shows sequence data taken from single stranded DNA purified using the microcentrifuge of the present invention.

As can be seen from TABLE 3, the present invention provides a fully automatic purification protocol, with a 100 fold reduction in cost. At the same time, the quality of the resulting sample is equivalent or better than the quality of samples obtained by the other two protocols of the prior art, and is adequate for DNA sequencing. Sequence data of ss DNA purified by a prior art centrifuge, and ss DNA purified using a centrifuge of the instant invention, are shown in FIGS. 10a and 10b, respectively.

It will be clear to one skilled in the art that the various embodiments described hereinabove may be altered or modified in many ways without departing from the scope of the invention. Accordingly, the scope of the invention should be determined by the following claims and their legal equivalents.

What is claimed is:

1. A method of simultaneously centrifuging a plurality of samples, the method comprising the steps of:
   introducing a sample into at least two containers, wherein each of the containers comprises at least one opening and a chamber, and wherein each of the containers is positioned within a socket of a substrate, the substrate comprising a plurality of sockets;
   rotating each of the containers around a single longitudinal axis of the chamber of each container, said rotating subjecting the sample in the container to centrifugal force sufficient to separate the sample into at least two components;
   wherein each of the containers comprises a first opening for introduction of a sample and a second opening through which a separated sample component can flow, and wherein the separated sample component is collected into a well of a sample collection substrate comprising a plurality of wells, the sample collection substrate being aligned with the container holder such that a well of the sample collection substrate is aligned with a socket of the container holder.

2. A method of simultaneously centrifuging a plurality of samples, the method comprising the steps of:
   introducing a sample into each of a plurality of containers, each container having at least one opening for introduction of the sample and a chamber, each container being positioned in a container holder comprising a plurality of sockets for receiving the containers, the container holder comprising a duct for introduction of a fluid or a gas stream for rotation of the containers; and
   simultaneously rotating each of the containers independent of the container holder, said rotating being around a longitudinal axis of the chamber of each container, and said rotating subjecting the sample to centrifugal force sufficient to separate the sample into at least two components.

3. A method of simultaneously centrifuging a plurality of samples, the method comprising the steps of:
   introducing a sample into each of a plurality of containers, each container having at least one opening for introduction of the sample and a chamber, each container being positioned in a container holder, the container holder comprising a plurality of sockets for receiving the containers, wherein the containers are ordered in a two-dimensional array in the container holder; the two-dimensional array of containers being aligned with a sample collection substrate so that a well of the sample collection substrate is aligned with at least one of the sockets of the container holder; and
   simultaneously rotating each of the containers independent of the container holder, said rotating being around a longitudinal axis of the chamber of each container, and said rotating subjecting the sample to centrifugal force sufficient to separate the sample into at least two components.

4. The method of claim 2 or 3, wherein the containers are rotated prior to introducing the sample.

5. The method of claims 2 or 3, wherein the containers comprise one opening for introduction of a sample and withdrawal of a separated sample component.

6. The method of claims 2 or 3, wherein the containers comprise a second opening through which a separated sample component can flow.

7. The method of claim 6, wherein the method further comprises collecting a component of the sample that flows through the second opening of the containers.

8. The method of claim 2 or 3, wherein the external diameter of each container is from about 8 mm to 9 mm.

9. A method of simultaneously centrifuging a plurality of samples, the method comprising the steps of:
   introducing a sample into at least two containers, wherein each of the containers comprises at least one opening and a chamber, and wherein each of the containers is rotatably positioned in a socket of a container holder, the container holder comprising a plurality of sockets and a duct for the introduction of a fluid to the container holder, wherein introduction of the fluid into the container holder causes a fluid stream to be directed against an exterior surface of each of the containers in the container holder to facilitate rotation of the containers;
   rotating each of the containers simultaneously around a single longitudinal axis of the chamber of each container, said rotating causing rotation of each container without rotation of the container holder and subjecting the sample in the container to centrifugal force sufficient to separate the sample into at least two components;
   collecting a separated sample component from each of the containers.

10. The method of claim 9, wherein the containers comprise a single opening for introduction of a sample and withdrawal of a separated sample component.

11. The method of claim 9, wherein the containers comprise a surface indentation to facilitate rotation of the containers around the longitudinal axis upon contact of the fluid stream.

12. A method of simultaneously centrifuging a plurality of samples, the method comprising the steps of:
   introducing a sample into at least two containers, wherein each of the containers comprises at least one opening and a chamber, and wherein each of the containers is rotatably positioned in a socket of a container holder, the container holder comprising a plurality of sockets, said introducing of the sample being accomplished by transfer of the sample from a well of a sample source substrate comprising a plurality of wells into the containers;
   rotating each of the containers around a single longitudinal axis of the chamber of each container, said rotating causing rotation of each container without rotation of the container holder and subjecting the sample in the container to centrifugal force sufficient to separate the sample into at least two components; and
   collecting a separated sample component from each of the containers.

13. The method of claim 12, wherein the containers comprise a single opening for introduction of a sample and withdrawal of a separated sample component.

14. The method of claim 12, wherein each of the containers has an external diameter ranging from about 8 mm to about 9 mm.

15. A method of simultaneously centrifuging a plurality of samples, the method comprising the steps of:

introducing a sample into at least two containers, wherein each of the containers comprises an opening and a chamber, and wherein each of the containers is positioned in a stationary substrate, wherein the substrate comprises sockets in which the containers are positioned, and wherein the substrate comprises a duct for the introduction of a fluid, and wherein the introduced fluid causes a fluid stream to be directed against an exterior surface of each of the containers to facilitate rotation of the containers;

rotating each of the containers simultaneously and around a single longitudinal axis of the chamber of each container, said rotating subjecting the sample in the container to centrifugal force sufficient to separate the sample into at least two components; and collecting a separated sample component from each of the containers.

16. The method of claim 15, wherein the method further comprises simultaneously stopping the rotating containers prior to said collecting.

17. The method of claim 15, wherein each of the containers comprises a surface indentation to facilitate rotation of the container upon contact of the fluid stream.

18. The method of claims 2, 3, 9, 12, or 15, wherein each of the containers is adapted for removable insertion in one of the sockets.

19. A method of simultaneously centrifuging a plurality of samples, the method comprising the steps of:

introducing a sample into at least two containers, wherein each of the containers comprises an opening and a chamber, and wherein each of the containers is positioned in a stationary substrate, wherein said introducing of the sample is accomplished by transfer of a sample from a well of a sample source substrate comprising a plurality of wells into the containers;

rotating each of the containers simultaneously and around a single longitudinal axis of the chamber of each container, said rotating subjecting the sample in the container to centrifugal force sufficient to separate the sample into at least two components; and collecting a separated sample component from each of the containers.

20. The method of claim 19, wherein the method further comprises simultaneously stopping the rotating containers prior to said collecting.

21. The method of claim 19, wherein the stationary substrate comprises sockets in which the containers are positioned.

22. The method of claim 21, wherein the containers are received within the sockets so as to be positioned within the stationary substrate.

23. The method of claim 22, wherein the stationary substrate comprises a duct for the introduction of a fluid, and wherein the introduced fluid causes a fluid stream to be directed against an exterior surface of each of the containers to facilitate said rotating.

24. The method of claim 23, wherein each of the containers comprises a surface indentation to facilitate rotation of the container around the longitudinal axis upon contact of the fluid stream.

25. The method of claim 19, wherein each of the containers is adapted for removable insertion with the stationary substrate.

* * * * *